Jan. 14, 1958 H. NOPP ET AL 2,820,096
CIRCUIT ARRANGEMENT FOR LOUDSPEAKER TELEPHONE SYSTEMS
Filed June 11, 1954
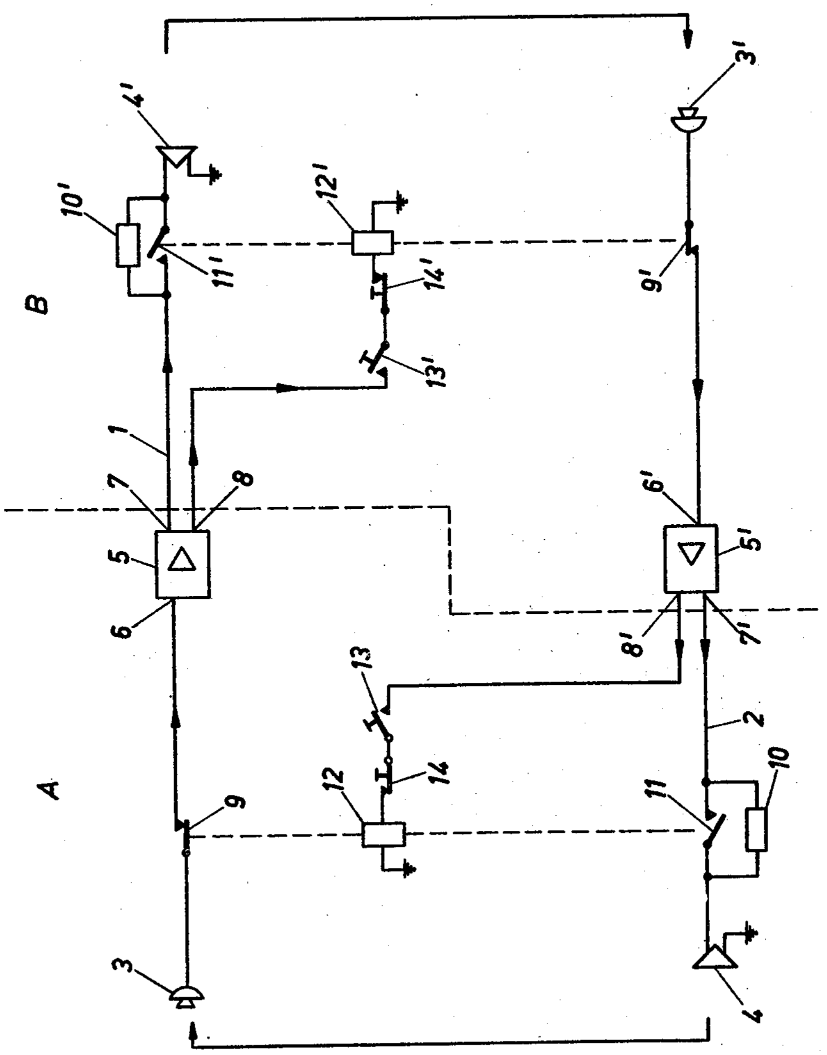
INVENTORS
H. NOPP
K. WERNICK
BY Robert Harding Jr.
ATTORNEY 2,820,096
Patented Jan. 14, 1958

2,820,096

CIRCUIT ARRANGEMENT FOR LOUDSPEAKER TELEPHONE SYSTEMS

Heinz Nöpp, Korntal, Wurttemberg, and Klaus Wernick, Ludwigsburg, Wurttemberg, Germany, assignors to International Standard Electric Corporation, New York, N. Y., a corporation of Delaware Application June 11, 1954, Serial No. 436,135

Claims priority, application Germany June 13, 1953

5 Claims. (Cl. 179—1)

This invention relates to a circuit for loudspeaker telephone systems and more particularly to duplex systems and a method for eliminating audio feed-back therein.

In duplex operations between two stations having respective microphones and loudspeakers, audio feed-back will result unless the total gain of the amplifying circuits is less than unity. Where the background or external noises in the room at one station reach a level substantially equal to the level of the received signals, the operator will be unable to properly understand the received signals.

Accordingly, it is an aim of the invention, in a duplex loudspeaker telephone system, to improve the reception of signals in a noisy location by permitting an increased level of amplification without running the risk of incurring audio feed-back over the system. It is an object therefore to modify the connections of a duplex system in such a way that only one station will transmit at a higher amplitude level than used in duplex operation upon actuation of a switch element at the station suffering from background noise under control of the amplifier delivering the amplified signals to the loudspeaker at said noisy location. It is a further object of the invention to automatically change the aforementioned modified arrangement to full duplex operation upon the conclusion of the transmission to the station at the noisy location. It is a further object of the invention to render ineffective the aforementioned modifying circuit by the operation of a switching device at the station in the noisy location.

It is a further object of the invention to selectively modify a duplex system to a simplex system to permit a high level of amplification without generating an audio feed-back between stations and to automatically restore the system to duplex operation at the conclusion of a transmission.

A more thorough understanding of the present invention may be had from the following detailed description and the accompanying drawing which is a schematic diagram of the circuit elements used to practice the invention.

Referring now to the drawing there are shown schematically two subscriber stations A and B interconnected respectively by transmission paths 1 and 2. The speech equipment at station A consists of a microphone 3, a loudspeaker 4 and an amplifier 5. The equipment at station B is identical and is marked with primed reference numerals, and the connection of the equipment at each station is identical.

At station A, the amplifier 5 is provided with an input 6 and a pair of outputs 7, 8; the output 7 being coupled to path 1. Microphone 3 is adapted to be normally coupled to input 6 of amplifier 5 via normally closed contacts 9. Microphone 3' in station B is adapted to be similarly coupled to amplifier 5'. As stated before, one end of path 1 is coupled to output 7 of amplifier 5 and one end of path 2 is coupled to output 7' of amplifier 5'. The other ends of paths 1 and 2 are connected to one terminal of an attenuating device 10', 10, respectively.

The other terminal of the attenuating devices are coupled to loudspeakers 4' and 4, respectively. The attenuating devices are adapted to be shunted by a pair of normally open contacts 11', 11, respectively. The attenuating devices serve the purpose of normally decreasing the output signal amplitude applied to the loudspeakers from the amplifiers to a level at or near unity. It will be seen that closure of contacts 11 or 11' will result in an increased signal being applied to the associated speaker rendering an output level therefrom substantially in excess of unity. Contacts 11 and 11' are under control of known types of sound-responsive relays indicated as 12 and 12', respectively. The relays 12, 12' are coupled to output 8, 8' of amplifiers 5, 5'; and are adapted respectively to be operated thereby. The relay 12 has one end of its winding connected to ground and the other end to a normally opened key contact 13. The contact 13 is connected to output 8' via a normally closed key contact 14. Similarly relay 12' is coupled to output 8 via normally closed contact and normally opened key contact 13'.

As shown in the drawing, each station may communicate with the other without the danger of audio feed-back occurring since each loudspeaker is dampened by the series resistance of the attenuators 10 and 10'. Since the gain of the circuit is less than unity, no feed-back will occur. If, on the other hand, background noise at station B for example, attains a level comparable to the sound level emanating from loudspeaker 4', the operator at station B will have difficulty in understanding the received signals. Accordingly, following the teachings of this invention, he will key contact 13' which completes the path from output 8 of amplifier 5 to the sound responsive relay 12'. Relay 12' operates and closes contact 11' and thereby shunts out attenuator 10' and causes the output level at speaker 4' to be increased. Simultaneously, contact 9' which is also controlled by relay 12', opens the microphone circuit from microphone 3' to amplifier 5' thereby disabling the said microphone and precluding the signals received from loudspeaker 4' from feeding-back through microphone 3' and thence into station A via amplifier 5' and speaker 4. At the conclusion of the transmission from station A, the output of amplifier 5 will decrease and relay 12' will deenergize and release, thereby opening contact 11' and simultaneously closing contact 9' restoring the station B to full duplex operation.

In the event that relay 12' has operated as pointed out above, the operator at station B need not necessarily wait until the transmission from station A is completed and for a cessation of output from the amplifier 5 in order to disable the relay 12'. To cover this contingency the normally closed key contact 14' is provided and which upon actuation by the operator, opens the path between the relay 12' and the amplifier 5 causing the opening of contacts 11' and the closure of contacts 9'. A similar complement of contacts are provided for station A which may be operated in the same manner as that described above in connection with station B.

The relays 12 and 12' may be known types of alternating current-responsive relays or they may be direct current relays connected in series with a rectifier (not shown). The attenuators 10 and 10' may alternatively be made up of variable resistive elements or electron discharge devices whose resistivity may be altered by outputs from the amplifiers which feed their associated loudspeakers.

While we have described above the principles of our invention in connection with specific apparatus, it is to be clearly understood that this description is made only by way of example and not as a limitation of the scope of our invention as set forth in the objects thereof and in the accompanying claims.

What is claimed is:

1. A duplex loudspeaker telephone system comprising a pair of stations, each station comprising a microphone, a loudspeaker, means connecting the microphone at one station with the loudspeaker of the other, said connecting means including a separate communications path, means for normally attenuating the energy in each path to inhibit audio oscillation between said paths, manually actuable means at each station for simultaneously rendering inoperative the attenuating means and the microphone thereat, said manually actuable means including a control means responsive to a signal in its corresponding path for rendering effectual said manually operable means and to restore said attenuating means and said microphone to their original condition in the absence of a signal.

2. A duplex loudspeaker telephone system as claimed in claim 1, wherein said control means comprises an electromagnetic relay having two sets of contacts, a first contact set connected to shunt said attenuating means and other contact set connected to disconnect said microphone upon operation of said relay.

3. A duplex loudspeaker telephone system as claimed in claim 1, wherein said connecting means comprises a pair of amplifiers, each of said amplifiers having an output coupled to a different one of said loudspeakers and to a different one of said control means.

4. A duplex loudspeaker system as claimed in claim 3, wherein said control means comprises an electromagnetic relay having a winding adapted to be coupled to an amplifier output by said manually actuable means.

5. A duplex loudspeaker telephone system as claimed in claim 4, wherein said control means further comprises a normally closed key contact serially disposed between said manually actuable means and said relay winding, said key contact adapted to selectively disconnect said relay winding independently of a received signal.

References Cited in the file of this patent

UNITED STATES PATENTS

| | | |
|---|---|---|
| 2,236,645 | Levy | Apr. 1, 1941 |
| 2,545,467 | Jeanlin | Mar. 20, 1951 |
| 2,545,476 | Levy | Mar. 20, 1951 |